United States Patent
Goris et al.

(10) Patent No.: US 7,319,889 B2
(45) Date of Patent: *Jan. 15, 2008

(54) SYSTEM AND METHOD FOR CONSERVING BATTERY POWER IN A MOBILE STATION

(75) Inventors: Norman Goris, Dortmund (DE); Wolfgang Scheit, Rothenbach (DE)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/516,316

(22) Filed: Sep. 6, 2006

(65) Prior Publication Data

US 2007/0004470 A1 Jan. 4, 2007

Related U.S. Application Data

(63) Continuation of application No. 10/463,630, filed on Jun. 17, 2003, now Pat. No. 7,113,811.

(51) Int. Cl.
*H04M 1/00* (2006.01)

(52) U.S. Cl. ............... 455/574; 455/566; 455/41.2; 455/343.1; 455/550.1

(58) Field of Classification Search ........... 455/550.1, 455/41.2, 566, 572–574, 343.1–343.6, 90.1–90.3, 455/69, 522; 315/169.3, 160; 345/211, 345/156, 166, 169; 713/230, 300–340; 340/7.32, 539.23, 539.26, 539.3; 379/55.1, 379/56.1–56.3, 370–376.02
See application file for complete search history.

(56) References Cited

U.S. PATENT DOCUMENTS

| | | | |
|---|---|---|---|
| 5,712,911 A | 1/1998 | Her | 379/388.01 |
| 5,881,377 A | 3/1999 | Giel et al. | 455/343.1 |
| 5,884,156 A | 3/1999 | Gordon | 455/552.1 |
| 6,246,862 B1 | 6/2001 | Grivas et al. | 3/566 |
| 6,265,833 B1 | 7/2001 | Kim et al. | 315/169.3 |
| 6,278,887 B1 | 8/2001 | Son et al. | 455/566 |
| 6,330,457 B1 | 12/2001 | Yoon | 455/550.1 |
| 6,665,803 B2 * | 12/2003 | Lunsford et al. | 713/320 |
| 6,684,294 B1 | 1/2004 | Huffman | 711/112 |
| 6,726,099 B2 | 4/2004 | Becker et al. | 235/380 |
| D493,451 S | 7/2004 | Wada | D14/247 |
| 6,836,212 B2 | 12/2004 | Sawinski | 340/539.23 |
| 6,853,850 B2 | 2/2005 | Shim et al. | 455/560.1 |
| 2002/0084998 A1 | 7/2002 | Sawada | 345/211 |
| 2002/0177475 A1 | 11/2002 | Park | 455/574 |
| 2003/0036412 A1 | 2/2003 | Chong | 455/566 |
| 2003/0197597 A1 * | 10/2003 | Bahl et al. | 340/7.32 |
| 2004/0097261 A1 | 5/2004 | Ujii | 455/575.1 |
| 2004/0198458 A1 | 10/2004 | Kawamura | 455/566 |

(Continued)

FOREIGN PATENT DOCUMENTS

DE 195 37 224 A1 8/1995

*Primary Examiner*—George Eng
*Assistant Examiner*—Kamran Afshar

(57) ABSTRACT

In one embodiment, a mobile station including a chassis having a display, a power reducer, a proximity sensor, and a microprocessor. The power reducer controls power consumption of the display. The proximity sensor is coupled to the chassis and causes the power consumption to be reduced when the display is within a predetermined range of an external object. The microprocessor is coupled to the proximity sensor and to the display and automatically activates the proximity sensor based on the mobile station receiving an incoming wireless telephone call.

13 Claims, 4 Drawing Sheets

U.S. PATENT DOCUMENTS

| | | | |
|---|---|---|---|
| 2004/0225904 A1 | 11/2004 | Perez et al. | 713/320 |
| 2004/0252115 A1* | 12/2004 | Boireau | 345/211 |
| 2006/0019724 A1* | 1/2006 | Bahl et al. | 455/574 |
| 2003/0284848 * | 12/2006 | Lin | 345/169 |

* cited by examiner

SYSTEM AND METHOD FOR CONSERVING BATTERY POWER IN A MOBILE STATION

CROSS-REFERENCE TO RELATED APPLICATIONS

This application is a continuation of U.S. application Ser. No. 10/463,630, filed on Jun. 17, 2003, now U.S. Pat. No. 7,113,811 the teachings of which are incorporated herein by reference.

TECHNICAL FIELD OF THE INVENTION

The present invention is directed, in general, to mobile stations and, more specifically, to a mobile station of mobile radio system having a reduced power consumption under certain operating conditions.

BACKGROUND OF THE INVENTION

Mobile stations have found many uses in today's world. When paired with a single base station located at a user's own premises, they are called "cordless telephones." When they interact with various, geographically distributed cellular base stations, they are called "cellular telephones" or simply "cell phones."

Usually the stand-by time, as well as the talk-time, of a mobile station depend on the lifetime of a (rechargeable) battery inserted within the mobile station and hence, on the load and/or on the capacity of the battery.

Increasing of the capacity of the battery would increase the lifetime of the mobile station, but batteries having increased capacities are often larger, heavier or more expensive, none of which are desirable attributes for a portable, affordable mobile station. Accordingly, what is needed in the art is a way to prolong the lifetime of a mobile station without having to use a battery with an increased capacity.

SUMMARY OF THE INVENTION

To address the above-discussed deficiencies of the prior art, the present invention provides a mobile station, including: (1) a chassis having a display and (2) a proximity sensor coupled to the chassis and adapted to cause a power consumption of the display to be reduced when the display is within a predetermined range of an external object.

Thus, by reducing the power consumption of the display of an activated telephone set in case the display is not needed, i.e., in particular during a telephone call, current is saved instead of needlessly consumed from the (rechargeable) battery. Accordingly, the spared available battery power may be significant, especially for color displays, resulting in an overall increasement of the stand-by and/or talk time of the telephone set.

According to preferred embodiments the means are adapted to switch-off the display in response to a detection that the set, preferably the display of the set, is attached near to an object, in particular to the ear.

As a consequence, if a call for example is incoming for example, possibly the user wants to see by means of the display the number and/or the stored name of the calling party. However, if the user wants to accept the call and hence is attaching the telephone set to the ear, the invention enables that the display is switched off. In a similar way, in case the user is trying to call a third party he may want to have a look at the display for verifying the entered number, but when the call is established he is likewise attaching the set and accordingly the display to his ear for performing the call. On the other hand, as long as the telephone set is inside a pocket, for example, it is not necessary to keep the display in an on-condition or to indicate the number and/or the name of a calling party.

Moreover, the means may be further adapted to switch-on the display in response to a detection that the set, preferably the display of the set, is moved away from any object, in particular from the ear.

As an alternative or in addition, the triggering event for current saving purposes may also be selectable by the user, for example via a menu list. According to further preferred refinements, the proximity sensor is proposed to be a heat flow or temperature sensor, an optical or infrared sensor, or a load sensor. However, as a further advantage, basically any kind of proximity sensor which is capable of observing a close range or small distance may be used.

Correspondingly, the invention proposes a method for saving available battery power of a mobile station, in particular of a mobile station comprising the steps of detecting an attachment of the set, in particular of the display of said set near to an object, in particular to the ear, and switching off the display in response to such a detection in case the display is in an on-condition.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
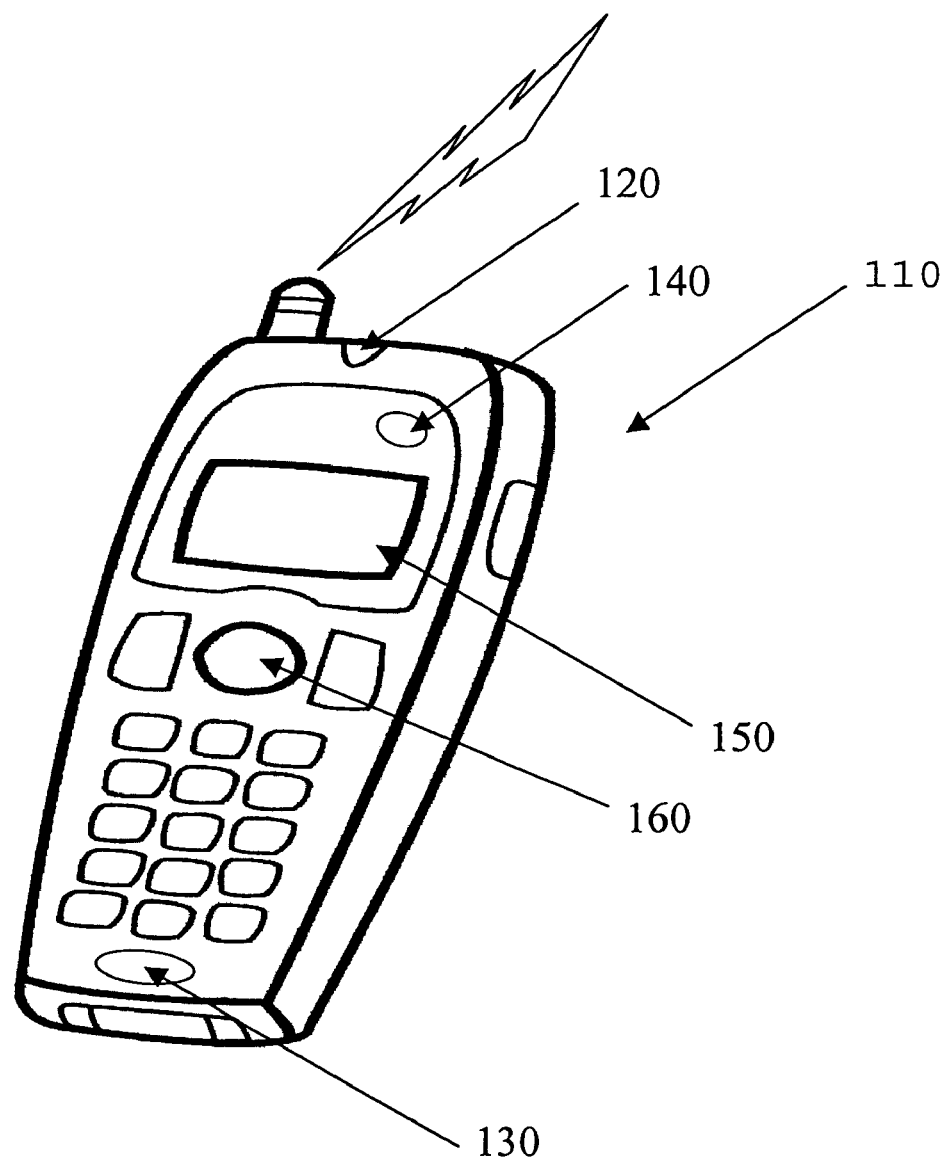
FIG. 1 schematically depicts a preferred embodiment of a mobile station having the inventive detection functionality.

FIG. 1 illustrates a mobile station 110 of a mobile radio telecommunication system having a loudspeaker 120 and a microphone 130. A proximity sensor 140 is located near a display 150 toward a side of the loudspeaker 120. A keypad 160 allows a user (not shown) to establish an outgoing call, accept an incoming call and/or terminate an active call. However, it should be apparent to one skilled in the pertinent art, that these functionalities can be also performed by other control means, for example by speech control. The proximity sensor 140 is integrated within the mobile station 110 to enable a functionality as described in more detail with regard to FIG. 2.

Figure 2:
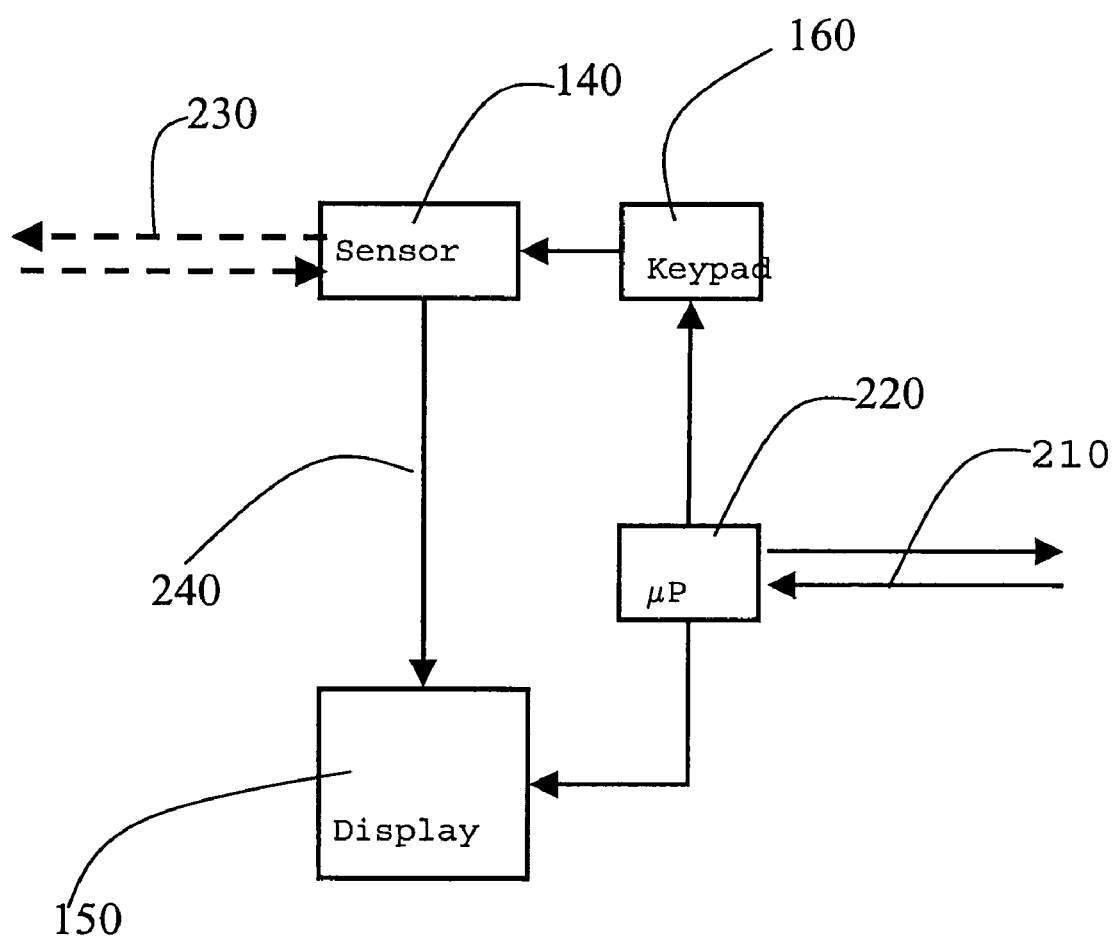
FIG. 2 schematically depicts a block diagram showing essential components of the invention.

As can be seen from FIG. 2, an incoming call may be managed by a central processing unit 220, for example for further specific processing. For example, the number or the name of the calling party stored within a storage (not referenced) implemented within the mobile station 110 can be depicted at the display 150.

If the user of the mobile station 110 wants to accept the incoming call 210, he may press a key on the keypad 160 or issue a voice command. Alternatively, an incoming call may directly activate the proximity sensor 140 without the necessity of pressing a key on the keypad 160 to accept the call.

In response to the acceptance of the incoming call 210 or automatically, the proximity sensor 140 is activated to monitor a proximity 230 to an external object (not shown), for example a range of about five centimeters. This is preferably done by a standard low-cost proximity sensor, for example a thermal sensor. However, other proximity sensors, such as conventional mechanical proximity (load) sensors, optical sensors or range detecting sensors, fall within the broad scope of the present invention. If the proximity sensor 140 detects an external object (such as the user's ear) within the monitored range, the power consumption of the display 150 is reduced, most preferably by switching the display 150 completely off, as indicated by an arrow 240, to spare battery power during the telephone call.

When the telephone call 210 is finished, the user of the mobile station 110 typically moves the mobile station 110 away from his ear. This causes the proximity sensor 140 to move out of range of the external object (in this case the user's ear). Accordingly, in response thereto, the display 150 is switched back on, enabling the user to look at information on the display 150.

Correspondingly, for an outgoing call, the proximity sensor 140 is activated by pressing a key on the keypad 160 to establish the outgoing call to a third party. As long as the outgoing call remains in effect and the proximity sensor 140 detects proximity to an external object, e.g., the ear of the user, the display 150 remains in a state of reduced power consumption, or off, as the case may be.

The function of switching the display off or on or otherwise reducing the amount of power the display consumes may comprise hardware and/or software components. For example, electronically readable instructions executable in the central processing unit 220 may be stored on a memory chip located in the mobile station 110 and adapted to cooperate with the proximity sensor 140 to perform the function.

Moreover, if the proximity sensor 140 is directly activated by an incoming call or automatically activated, the display can be kept in a switched-off condition as long as the mobile station 110 is, for example, within a pocket (not referenced) or the like and is only switched on when the user retrieves the mobile station 110 from the pocket to enable the user to look on the display 150 for an information about the calling party. If the user then wants to accept the call and thence places the mobile station 110 proximate an external object, such as his ear, the proximity sensor 140 again detects an object, causing the display again to be switched off.

Figure 3:
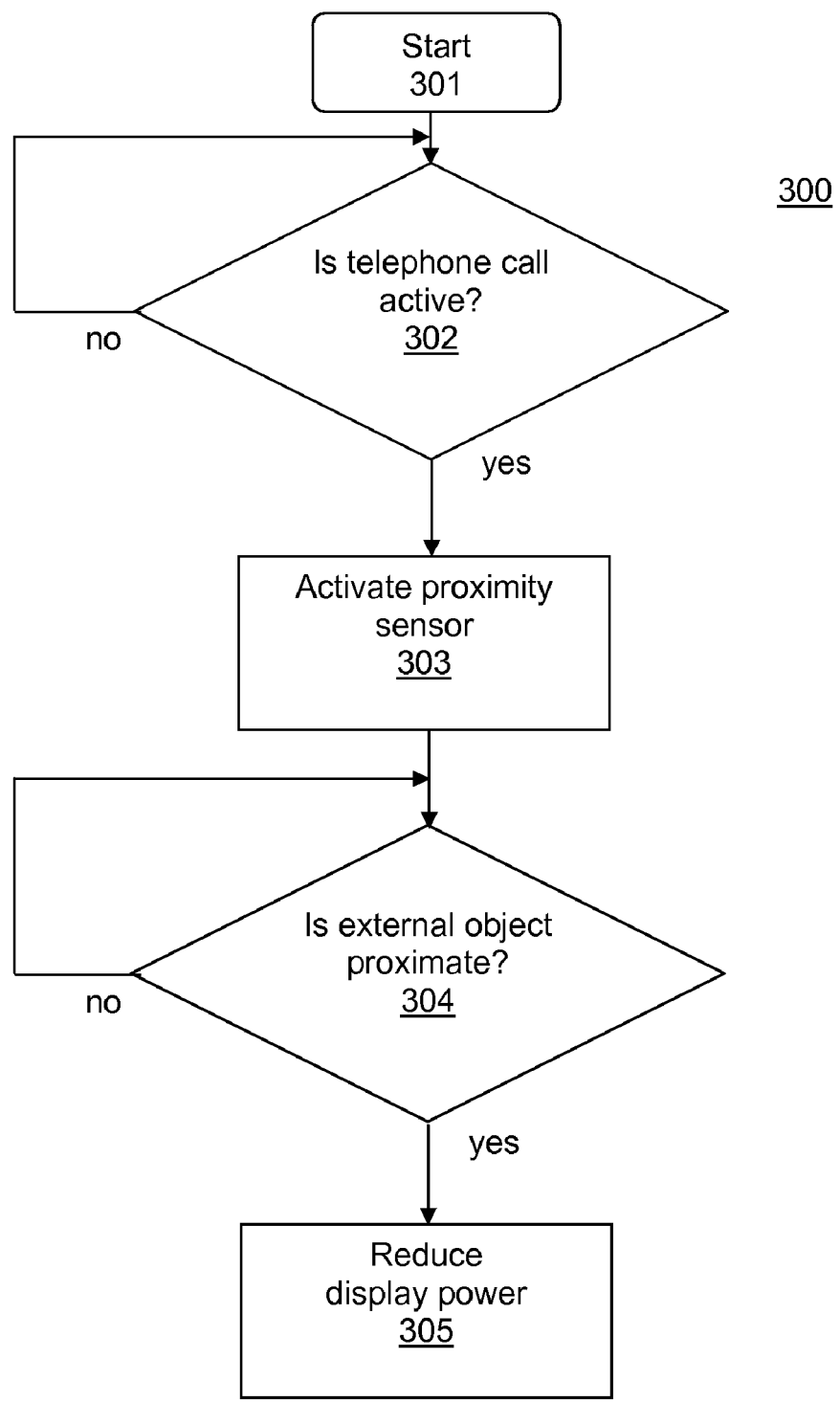
FIG. 3 is a flow diagram of exemplary steps for reducing power to a display.
Figure 4:
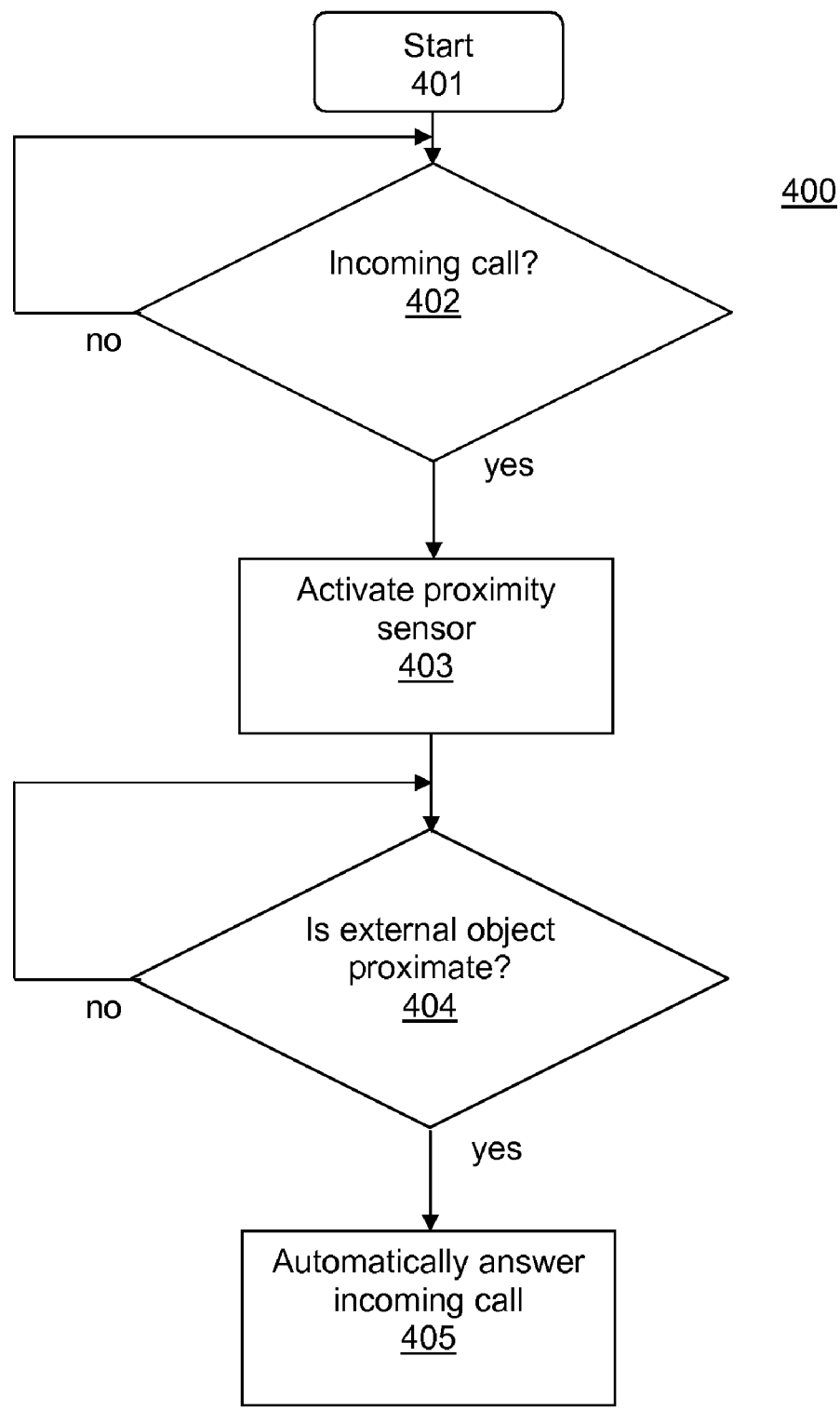
FIG. 4 is a flow diagram of exemplary steps for automatically answering an incoming call.

FIG. 3 illustrates exemplary steps for reducing power to a display, as described above, and FIG. 4 illustrates exemplary steps for automatically answering an incoming call, as described above.

Although the present invention has been described in detail, those skilled in the art should understand that they can make various changes, substitutions and alterations herein without departing from the spirit and scope of the invention in its broadest form.

What is claimed is:

1. A mobile station, comprising:

a display;

a proximity sensor adapted to generate a signal indicative of proximity of an external object; and a microprocessor adapted to:

(a) determine whether a telephone call is active;

(b) receive the signal from the proximity sensor; and (c) reduce power to the display if (i) the microprocessor determines that a telephone call is active and (ii) the signal indicates the proximity of the external object;

wherein:

the telephone call is a wireless telephone call;

the microprocessor reduces power to the display while the signal indicates the proximity of the external object only if the microprocessor determines that the wireless telephone call is active; and the proximity sensor begins detecting whether an external object is proximate substantially concurrently with the mobile station initiating an outgoing wireless telephone call or receiving an incoming wireless telephone call.

2. The mobile station of claim 1, wherein the microprocessor reduces power to the display only if (i) the microprocessor determines that a telephone call is active and (ii) the signal indicates the proximity of the external object.

3. The mobile station of claim 1, wherein, if (i) the microprocessor determines that an incoming telephone call arrives at the mobile station and (ii) the signal indicates the proximity of the external object, then the incoming telephone call is automatically answered.

4. The mobile station as recited in claim 1, wherein the microprocessor reduces power to the display by turning off the display.

5. The mobile station as recited in claim 1, wherein the proximity sensor is a mechanical proximity sensor, an optical sensor, or a range-detecting sensor.

6. The mobile station as recited in claim 1, wherein the proximity sensor is located proximate to the display.

7. The invention of claim 1, wherein, if (i) the microprocessor determines that the incoming wireless telephone call arrives at the mobile station and (ii) the signal indicates the proximity of the external object, then the incoming wireless telephone call is automatically answered without any further action by the user.

8. A method of conserving battery power in a mobile station, comprising:

detecting whether an external object is proximate;

determining whether a telephone call is active; and reducing power consumption of a display of the mobile station if (i) a telephone call is determined to be active and (ii) the proximity of the external object is detected;

wherein:

the telephone call is a wireless telephone call;

the power consumption of the display is reduced while the proximity of the external object is detected only if the wireless telephone call is determined to be active; and detecting whether an external object is proximate begins substantially concurrently with the mobile station initiating an outgoing wireless telephone call or receiving an incoming wireless telephone call.

9. The method of claim 8, wherein the power consumption of the display is reduced only if (i) a telephone call is determined to be active and (ii) the proximity of the external object is detected.

10. The method of claim 8, further comprising:
if (i) an incoming telephone call is determined to arrive at the mobile station and (ii) the proximity of the external object is detected, then automatically answering the incoming telephone call.

11. The method as recited in claim 8, wherein reducing power consumption of the display comprises turning off the display.

12. The method as recited in claim 8, wherein the detecting of the proximity of the external object is performed by a mechanical proximity sensor, an optical sensor, or a range-detecting sensor.

13. The method of claim 8, further comprising:
if (i) the incoming wireless telephone call is determined to arrive at the mobile station and (ii) the proximity of the external object is detected, then automatically answering the incoming wireless telephone call without any further action by the user.

* * * * *

UNITED STATES PATENT AND TRADEMARK OFFICE
CERTIFICATE OF CORRECTION

PATENT NO. : 7,319,889 B2
APPLICATION NO. : 11/516316
DATED : January 15, 2008
INVENTOR(S) : Norman Goris and Wolfgang Scheit It is certified that error appears in the above-identified patent and that said Letters Patent is hereby corrected as shown below:

On Title page item 56

On page 2, U.S. PATENT DOCUMENTS, replace "2003/0284848" with --2006/0284848--.

Signed and Sealed this

Third Day of June, 2008

JON W. DUDAS
*Director of the United States Patent and Trademark Office*